T. W. KIRKMAN.
JOURNAL BEARING.
APPLICATION FILED AUG. 13, 1917.
1,298,734.
Patented Apr. 1, 1919.
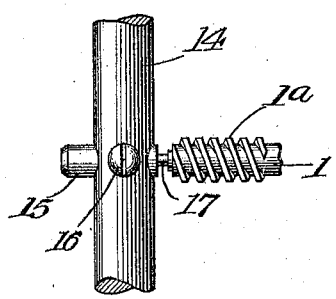
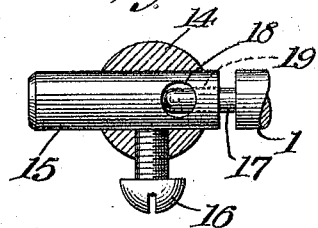 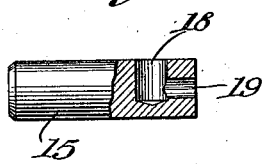
Inventor
T. W. Kirkman
by Robert M. Pierson,
atty.

UNITED STATES PATENT OFFICE.

THOMAS W. KIRKMAN, OF NEW YORK, N. Y.

JOURNAL-BEARING.

1,298,734.  Specification of Letters Patent.  Patented Apr. 1, 1919.

Original application filed May 8, 1917, Serial No. 167,300. Divided and this application filed August 13, 1917. Serial No. 186,040½.

*To all whom it may concern:*

Be it known that I, THOMAS W. KIRKMAN, a citizen of the United States, residing at New York, in the county and State of New York, have invented certain new and useful Improvements in Journal-Bearings, of which the following is a specification.

The object of this invention is to provide a durable and substantially noiseless journal bearing for shafts, and particularly for the end of a small shaft revolving at high speed, such as that of a talking machine governor, although the invention may be employed wherever its use is found to be advantageous.

This application is a division of my application Serial No. 167,300, filed May 8, 1917, and patented Aug. 14, 1917, No. 1,236,449.

Of the accompanying drawings,

Figure 1 is a side elevation of a shaft having a journal bearing constructed according to my invention.

Fig. 2 is a horizontal section, partly in plan.

Fig. 3 is an elevation, partly in section, showing the removable bearing member.

1 is a shaft such as that of a talking machine governor, having a worm 1ª thereon adapted to mesh with a worm gear whereby the shaft is rotated. 14 is a supporting post or standard which is horizontally bored out or apertured in line with the shaft to receive a cylindrical bearing block 15, the latter being held in place by a set-screw 16 which is mounted in a threaded hole in the post 14. The axial adjustment of block 15 permits the taking up of any end-play in the shaft. The shaft journal 17 occupies a bearing hole 19 which is formed axially in the inner end of block 15 and communicates with a radial hole 18 formed in said block and extending to the surface of the latter. The hole 18 may contain a lubricant such as grease, which is effectively retained and protected from dust and other foreign matter by reason of the fact that the mouth of said hole is normally covered by the post 14, but the lubricant may be readily renewed and the bearing cleaned at any time by loosening screw 16 and withdrawing the block 15. By first drilling the transverse hole 18, then drilling the longitudinal bearing hole 19, and finally reaming the latter, the reamer can be run clear through the hole 19 and will cut an accurate hole for the journal 17, wherein the latter will run noiselessly and without appreciable wear if properly lubricated. To this end it is necessary that the hole 18 shall be larger than the hole 19 and embrace the entire diameter of the latter, as shown. The hole 18 is also adapted to receive, if desired, any suitable end-thrust and sound deadening member in addition to the lubricant, as will be obvious without illustration.

I claim:

1. The combination of a shaft having a cylindrical journal, a bearing holder, and a bearing member axially adjustable on said holder and formed with an axial, cylindrical bearing hole for said journal and a transverse communicating hole located at the inner end of said bearing hole and embracing the entire diameter of the latter.

2. The combination of a shaft having a cylindrical journal at one end, a support apertured in line therewith, and a bearing block axially adjustable in the aperture of said support and formed with a transverse hole covered by the support, and an axial, cylindrical bearing hole for said journal opening into the transverse hole and of smaller diameter than the latter.

In testimony whereof I have hereunto set my hand this 11th day of August 1917.

THOMAS W. KIRKMAN.

Copies of this patent may be obtained for five cents each, by addressing the "Commissioner of Patents Washington, D. C."